United States Patent
Ivanov et al.

(10) Patent No.: US 7,958,164 B2
(45) Date of Patent: Jun. 7, 2011

(54) VISUAL DESIGN OF ANNOTATED REGULAR EXPRESSION

(75) Inventors: Sergei Ivanov, Issaquah, WA (US); J. Kirk Haselden, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/356,383

(22) Filed: Feb. 16, 2006

(65) Prior Publication Data

US 2007/0198565 A1    Aug. 23, 2007

(51) Int. Cl.
G06F 7/00 (2006.01)
G06F 17/30 (2006.01)
G06K 9/72 (2006.01)

(52) U.S. Cl. .................. 707/805; 707/755; 382/229
(58) Field of Classification Search .............. 707/6, 100, 707/755; 382/229
See application file for complete search history.

(56) References Cited

U.S. PATENT DOCUMENTS

| | | | |
|---|---|---|---|
| 5,510,981 A | 4/1996 | Berger | |
| 6,016,467 A | 1/2000 | Newsted et al. | |
| 6,102,969 A | 8/2000 | Christianson et al. | |
| 6,108,676 A | 8/2000 | Nakatsuyama | |
| 6,202,064 B1 | 3/2001 | Julliard | |
| 6,493,713 B1 | 12/2002 | Kanno | |
| 6,496,835 B2 | 12/2002 | Liu | |
| 6,569,208 B2 | 5/2003 | Iyer et al. | |
| 6,571,243 B2 | 5/2003 | Gupta | |
| 6,678,681 B1 | 1/2004 | Brin | |
| 6,714,939 B2 | 3/2004 | Saldanha et al. | |
| 6,757,650 B2 | 6/2004 | Yasunaga et al. | |
| 6,782,505 B1 * | 8/2004 | Miranker et al. | 715/203 |
| 6,922,810 B1 | 7/2005 | Trower, II et al. | |
| 6,957,233 B1 | 10/2005 | Beezer | |
| 6,963,876 B2 | 11/2005 | Schreiber | |
| 6,987,839 B1 | 1/2006 | Lockwood | |
| 6,990,487 B2 | 1/2006 | Akaboshi | |
| 7,249,140 B1 | 7/2007 | Korenevsky | |
| 7,529,746 B2 | 5/2009 | Ichiriu | |
| 2001/0014890 A1 * | 8/2001 | Liu et al. | 707/102 |
| 2002/0042794 A1 | 4/2002 | Konaka | |

(Continued)

FOREIGN PATENT DOCUMENTS

WO    WO0118692    3/2001

OTHER PUBLICATIONS

"Expresso—a tool for building and testing regular expression", Jim Hollenhorst, Feb. 21, 2003.*

(Continued)

*Primary Examiner* — Pierre M Vital
*Assistant Examiner* — Sabana Rahman
(74) *Attorney, Agent, or Firm* — Workman Nydegger

(57) ABSTRACT

A system that provides a visual mechanism (e.g., user interface (UI)) by which a user can design a regular expression is provided. The graphical interactive mechanism enables a user to develop regular expressions without an understanding of the intricacies of the regular expression syntax. The UI can provide an interactive mechanism by which a user can graphically annotate (e.g., color, highlight) a regular expression thus, mapping the expression to a particular tabulated output. The novel UI can provide a particular kind of dialog layout with several controls and dynamically linked views, e.g., a data view, a regular expression view and a column view which can facilitate definition of the regular expression as well as creation of mappings to output columns (e.g., annotations).

14 Claims, 8 Drawing Sheets

U.S. PATENT DOCUMENTS

| | | | |
|---|---|---|---|
| 2002/0156817 A1 | 10/2002 | Lemus | |
| 2003/0018668 A1* | 1/2003 | Britton et al. | 707/513 |
| 2003/0050782 A1 | 3/2003 | Zweig et al. | |
| 2003/0212544 A1 | 11/2003 | Acero et al. | |
| 2004/0015909 A1 | 1/2004 | Cho et al. | |
| 2004/0019477 A1 | 1/2004 | Finkelstein | |
| 2004/0073546 A1 | 4/2004 | Forster | |
| 2004/0117395 A1 | 6/2004 | Gong et al. | |
| 2004/0187110 A1 | 9/2004 | Boyfield | |
| 2004/0225999 A1 | 11/2004 | Nuss | |
| 2004/0243560 A1 | 12/2004 | Broder et al. | |
| 2005/0010581 A1 | 1/2005 | Doan | |
| 2005/0060291 A1 | 3/2005 | Kirkland et al. | |
| 2005/0080763 A1 | 4/2005 | Opatowski | |
| 2005/0097514 A1 | 5/2005 | Nuss | |
| 2005/0108227 A1 | 5/2005 | Russell-Falla et al. | |
| 2005/0108267 A1 | 5/2005 | Gibson et al. | |
| 2005/0108630 A1 | 5/2005 | Wasson | |
| 2005/0234703 A1 | 10/2005 | Brill | |
| 2005/0251381 A1* | 11/2005 | Pentheroudakis et al. | 704/4 |
| 2007/0011157 A1* | 1/2007 | Tang | 707/6 |
| 2007/0027887 A1* | 2/2007 | Baldwin | 707/100 |
| 2007/0061740 A1* | 3/2007 | Marini | 715/762 |
| 2007/0130140 A1 | 6/2007 | Cytron | |

OTHER PUBLICATIONS

"SWYN: A visual representation for regular expression" Alan F. Blackwell, 2001.*

Piskorski, et al.; A Flexible XML-based Regular Compiler for Creation and Conversion of Linguistic Resources; 6 pages.

Blackwell; SWYN: A Visual Representation for Regular Expressions; 18 pages.

Tablan, et al.; A Unicode-based Environment for Creation and Use of Language Resources; 6 pages.

Cho, J., et al.; "A Fast Regular Expression Indexing Engine," (12 pages).

Sunspot; "Henry Spencer's Regexp Engine Revisited," (9 pages).

Cassidy, S.; "XQuery as an Annotation Query Language: a Use Case Analysis," Department of Computing, Macquarie University, (7 pages).

OA dated May 30, 2008 for U.S. Appl. No. 11/371,449 (25 pages).

Final OA dated Dec. 15, 2008 for U.S. Appl. No. 11/371,449 (39 pages).

Ramachandran, et al., "An Architecture for Ink Annotations on Web Documents," 2003, ICDAR '03, IEEE (5 pages).

Marwick, Alan., "Text Mining for associations using UIMA and DB2 Intelligent Miner," Feb. 2, 2006, IBM (10 pages).

Barnett, et al., Regular Expressions and Extended Pattern Matching, 1991, Bruce Barnett & General Electric Company.

Brown, Stan., GREP—Find Regular Expressions in Files Quick Start for Release 8.0, May 2005, Oak Road System.

U.S. Appl. No. 11/371,449, mail date Apr. 29, 2009, Office Action.

U.S. Appl. No. 11/371,449, mail date Nov. 12, 2009, Office Action.

U.S. Appl. No. 11/371,449, mail date Mar. 30, 2010, Office Action.

U.S. Appl. No. 11/371,449, mail date Sep. 13, 2010, Notice of Allowance.

* cited by examiner

VISUAL DESIGN OF ANNOTATED REGULAR EXPRESSION

CROSS-REFERENCE TO RELATED APPLICATIONS

This application is related to pending U.S. patent application Ser. No. 11/371,449 entitled "DATA PARSING WITH ANNOTATED PATTERNS" filed on Mar. 9, 2006. The entirety of the above-noted application is incorporated by reference herein.

BACKGROUND

A regular expression is often defined as a pattern matching language which can be employed to identify character strings, for example, to select specific strings from a set of character strings. More particularly, regular expressions are often defined as a context-independent syntax that can represent a wide variety of character sets and character set orderings.

In operation, regular expressions can be employed to search data based upon a predefined pattern or set of patterns. As such, this pattern matching language employs a specific syntax by which particular characters or strings are selected from a body of text. Although simple examples of regular expressions can be easily understood, oftentimes, the syntax of regular expressions are so complex that even the most experienced programmers have difficulty in understanding them.

A reoccurring issue posed by the complex syntax of regular expressions is that many users lack the knowledge necessary in order to design and/or verify an expression. Although a specific syntax can be provided by which regular expressions are constructed, the complexity of the syntax is further demonstrated in the fact that most sets of data can be described using multiple different syntactical expressions. It will further be understood that the specific syntax for a regular expression can vary among tools and application areas. This variation leads to even more complication with respect to understanding the intricacies of the regular expression mechanisms.

Although sometimes very difficult to understand, regular expressions are a very powerful and useful tool in the field data manipulation and extraction. The expressions can consist of constants and operators that denote sets of strings and operations over these sets, respectively. In operation, a user or programmer can perform advanced text pattern matching using the specific syntax of a regular expression. In most cases, regular expressions can provide more flexibility than simple wildcards in defining rules or views. The following table lists exemplary regular expression operators and their definitions. The syntax illustrated in the table is frequently employed to establish complex string pattern identifications.

| Menu Item | Character | Definition |
| --- | --- | --- |
| Any Character | . | Matches any single character. |
| Character in Range | [ ] | Matches any single character from within the bracketed list. Within square brackets, most characters are interpreted literally. |
| Character Not in Range | [^] | Specifies a set of characters not to be matched. |
| Beginning of Line | ^ | Matches the beginning of a line. |
| End of Line | $ | Matches the end of a line. |
| Or | \| | Matches either the regular expression preceding it or the regular expression following it. |
| Group | ( ) | Groups one or more regular expressions to establish a logical regular expression consisting of sub-regular expressions. Used to override the standard precedence of certain operators. |
| 0 or 1 Matches | ? | Specifies that the preceding regular expression is matched 0 or 1 time. |
| 0 or More Matches | * | Specifies that the preceding regular expression is matched 0 or more times. |
| 1 or More Matches | + | Specifies that the preceding regular expression is matched 1 or more times. |
| Exactly n Matches | {n} | Specifies that the preceding regular expression is matched exactly n number of times. |
| At Least n Matches | {n,} | Specifies that the preceding regular expression is matched n or more times. |
| At Most n Matches | {,n} | Specifies that the preceding regular expression is matched n or fewer times. |
| n to m Matches | {n,m} | Specifies that the preceding regular expression is matched a maximum of n times and a minimum of m times. If not specified, m defaults to 0. If n is not specified, the default depends on whether the comma is present. If no comma is present, n defaults to m. If a comma is present, n defaults to a very large number. |
| New Line Character | \n | Matches a new line. |
| Tab Character | \t | Matches a tab character. |

Because of the complex nature of the syntax involved in defining regular expressions, a reference sheet is most often required in order to assist in accurately formulating (and/or interpreting) a regular expression. As the complexity of the regular expression is illustrated in the table above, even the most skilled programmer often has difficulty designing a regular expression that coincides with a desired string pattern.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a system that can provide a visual mechanism (e.g., user interface (UI)) by which a user can design a regular expression. Because this novel UI provides a graphical interactive mechanism to design a regular expression, it can be particularly useful to enable a user to develop regular expressions without an understanding of the intricacies of the regular expression syntax.

In another aspect, the innovation can provide a UI by which a user can graphically annotate a regular expression thus, mapping the expression to a particular tabulated output. By way of example, the annotations can include coloring, highlighting, font formatting, etc. In operation, the annotations can map a particular portion of a regular expression to a designated portion (e.g., column) of a tabulated output.

In essence, the regular expression can be annotated with mappings that link a subsection of the expression to an output data column as the expression is matched to a selected portion of a body of text. The bytes matched by each annotated section of the expression can be transferred to a predefined area of the output data column. As such, this novel annotation UI can enable parsing of any body of text using regular expressions.

As stated above, the novel UI can provide a graphical way to design a regular expression. In accordance therewith, because the innovation employs a visual manner by which the regular expression can be designed, it is not necessary that the user know the details of the syntax of the regular expression language. Rather, the user can select data from a body of text whereas the system can automatically generate a regular expression that matches the graphically selected text. The novel UI can provide a particular kind of dialog layout with several controls which can facilitate definition of the regular expression as well as creation of mappings to output columns (e.g., annotations).

In accordance with disparate aspects, the novel UI can be graphically rendered as a dialog box that includes a data view, a regular expression view and an output column or tabulated view. Each of these views can be interactive with the others. By way of example, when one of the views is update via the UI, the corresponding views can be dynamically updated to reflect the change. In one aspect, the data view displays a sample of input data that can assist a user in visualizing a representation of a data format. Other aspects can include a data view of all of the data maintained in a body of text or data.

In accordance with the novel UI of the innovation, a user can select portions of the data displayed in the data view and the dialog can correspondingly select, in the regular expression view, the portion of a system-generated regular expression that matches the selected data. It will be understood that any mechanism can be employed to select the data including, but not limited to, pointing devices, touch screens, keyboards, etc.

In yet another aspect, the regular expression view can display a system-generated regular expression in text form. Selecting a portion of this regular expression can prompt dynamic selection of the data that matches that portion of the expression in the data view. Selection tools can be provided in order to facilitate visual selection by a user.

In still another aspect of the innovation, an output column view can be provided that renders a list of data columns that result from parsing the data unit. Novel regular expression annotations can be provided to map data to a column location such that the parser can effectuate the separation. In operation, a user can employ the novel UI to define the columns and their data types. Further, the UI can be employed to map portions of the regular expression to output columns in this list. This mapping refers to the application of annotations with respect to portions of the regular expression.

In an aspect of the innovation, annotations can be established by assigning a color to an output column. Accordingly, the user can select a portion of the regular expression and set the color for the selection. The color assignment (e.g., annotation) can represent a mapping of a section of the regular expression to the output column. In disparate aspects, other mechanisms of marking can be employed, including, but not limited to, highlighting, font formats (e.g., bold, italics, underline), etc. As well, other mechanisms such as click/drag operations can be employed to establish a link to a particular column.

In yet another aspect thereof, a heuristics component (e.g., artificial intelligence component) is provided that can employ a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
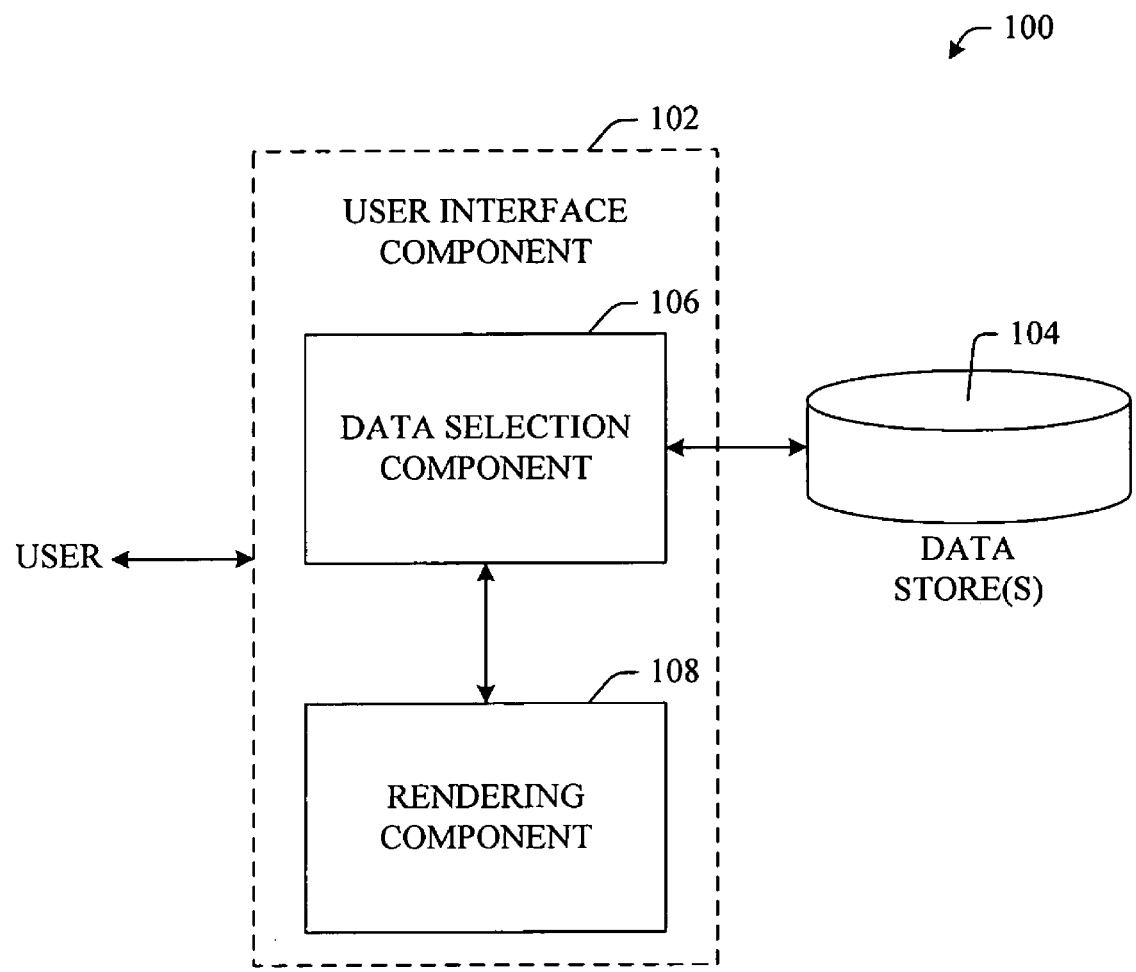
FIG. 1 illustrates a system that facilitates design and annotation of a regular expression in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain orientations of displaying information to users are shown and described with respect to certain figures, those skilled in the relevant art will recognize that various other alternatives can be employed. The pages screens or dialog boxes are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a system 100 that facilitates visual design of a regular expression in accordance with an aspect of the innovation. Generally, system 100 can include a user interface (UI) component 102 that enables a user to design and implement a regular expression with respect to data maintained in a data store 104 in accordance with an aspect of the innovation. Although the system 100 illustrated in FIG. 1 depicts a single data store 104, it is to be understood and appreciated that the novel UI 102 can be employed to parse and extract data from any number of local or remote data stores.

More particularly, the novel UI 102 can include a data selection component 106 and a rendering component 108. The data selection component 106 of the UI 102 can facilitate a user to graphically select data from the data store component 104. As will be better understood upon a review of the figures that follow, the data selection component 106 can be used in connection with the rendering component 108 to graphically render data, and selected subsets thereof, to a user.

In other words and in accordance with an aspect of the innovation, the rendering component 108 can graphically display the all of the data, or any subset thereof, in accordance with a regular expression. The data selection component 106 can include one or more selection mechanisms (e.g., tools) by which a user can graphically select and/or identify data. In operation, a user can employ the data selection component 106 to select a subset of the data. In accordance therewith, the rendering component 108 can analyze the selection thereafter establishing a syntactical regular expression as well as a tabulated view of the data in accordance with the selection.

Additionally, in order to further assist in the formulation of a tabulated view of the regular expression, the data selection component 106 can facilitate a user to distinctly mark portions of the syntactical regular expression. In accordance therewith, the rendering component 108 can dynamically render a graphical representation of the marked regular expression via a tabulated or column view. In other words, the regular expression can be annotated and the rendered data can be marked similarly in the graphical representation.

The subject innovation is directed to a novel mechanism that enables graphical design and generation of a regular expression. As well, another novel feature of innovation described herein is directed to a mechanism that can dynamically render data in a manner that assists in the establishment and interpretation of a regular expression. These novel features will be better understood upon a review of the figures that follow. Although specific examples and scenarios are provided herein, it is to be understood that these examples and scenarios are provided to add perspective to the innovation. As such, the aspects described herein are not intended to limit the innovation in any way.

As described above, the innovation can be particularly useful in parsing structured information. While the innovation can be used in connection with, and is described herein with reference to, data stored in a database, it is to be understood that the novel features of the innovation can be employed in connection with any type of structured data (e.g., flat files, XML).

As will be understood, there is a vast amount of data stored in text files which have different formats. By way of example, one company may have data stored in one format while another company has data stored in another format. A problem that exists is how to read that data and get it into a common database. Conventionally, a custom parser would have to be written to the desired format that is being read. Alternatively, a variety of flexible parsers could be employed where the metadata for a particular file format can be defined. To this end, in accordance with the metadata, the parser can read the data.

As such, a generalized parser can be employed that is driven by regular expressions that are annotated in a novel manner. Typically, a regular expression defined by a user is employed to match some amount of data. However, as described supra, knowledge of the specific data type's format as well as a specialized parser would have to be employed. In accordance with this innovation, a mechanism whereby a user can match an input stream to a regular expression while employing a set of annotations for the regular expression that map a region of the regular expression to a designated output column is disclosed.

Therefore, as the system parses and thereafter compares to the input stream, every time a character in the input stream matches the expression, the innovation can display what range of the expression the matching character falls into based upon the annotation(s). This graphical rendering is one of the novel features of the subject innovation.

Figure 2:
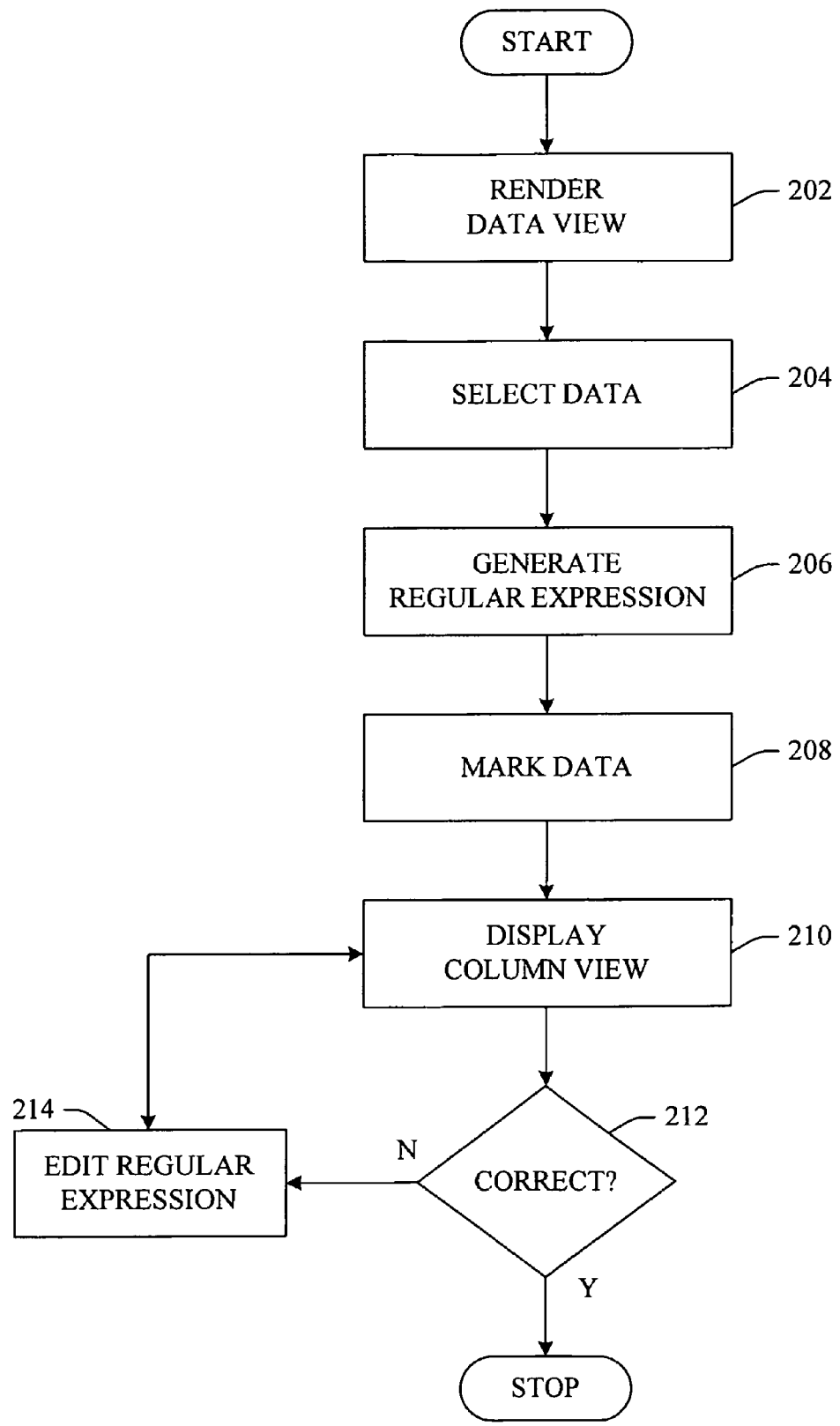
FIG. 2 illustrates an exemplary flow chart of procedures that facilitate designing a regular expression in accordance with an aspect of the innovation.

FIG. 2 illustrates a methodology of graphically displaying data based upon a regular expression in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202 a data view can be rendered which represents all, or a subset, of data in a store or group of stores. It will be understood and appreciated that the data view can be rendered in any manner without departing from the novel functionality of the innovation. Accordingly, at 204, data can be selected from the graphical representation of the data. In disparate aspect, any mechanism known in the art can be employed to select the data.

By way of example, in one aspect, a mouse, touchpad or other navigational device can be employed in order to effectuate a data selection. Similarly, a keyboard, touch screen or the like can be employed to make a particular selection. It is to be understood by those skilled in the art that any selection mechanism can be employed in accordance with the novel functionality described herein. These alternative aspects are to be included within the scope of this disclosure and claims appended hereto.

Once data is selected at 204, a regular expression can be automatically generated at 206. This regular expression can be represented in the syntactical form in accordance with the selected data. In other words, this regular expression can be rendered for display to a user in a syntactical manner.

In accordance with the auto-generated regular expression, data can be rendered (e.g., displayed) that represents an output data set based upon application of the regular expression upon the complete data set. It will be appreciated that the aforementioned acts describe one novel feature of the innovation, graphical generation of a regular expression. As such, it will be appreciated that a user does not have to know the intricate syntax of regular expressions. Rather, the system can automatically generate a regular expression based upon a user data selection.

Another novel feature of the innovation is the ability to display an output of the regular expression when applied upon the complete data set. At 208, desired portions of the syntactical rendition of the regular expression can marked in a conspicuous manner such that when the data is rendered, the rendered data is also marked in a similar conspicuous manner. In other words, this method of marking can assist a user to validate the system-generated regular expression.

By way of further example, at 210, an output of the data can be rendered in a table bearing the conspicuous markings. Once rendered, a user can compare the rendered output to the system-generated regular expression. To this end, at 212, a determination can be made if the output represents the desired data.

If at 212, the data does not represent the desired data, the syntactical regular expression can be manually edited at 214. Accordingly, the output data can dynamically update in accordance with any user defined edits as illustrated. As shown, this process can be recursive until the user reaches the desired output data. Thus, the syntactical regular expression can be generated without knowledge of the intricate syntax of regular expressions. On the other hand, if at 212, the data does represent the desired data, this is an indication that the syntax of the system-generated regular expression is correct and a stop block is reached.

Figure 3:
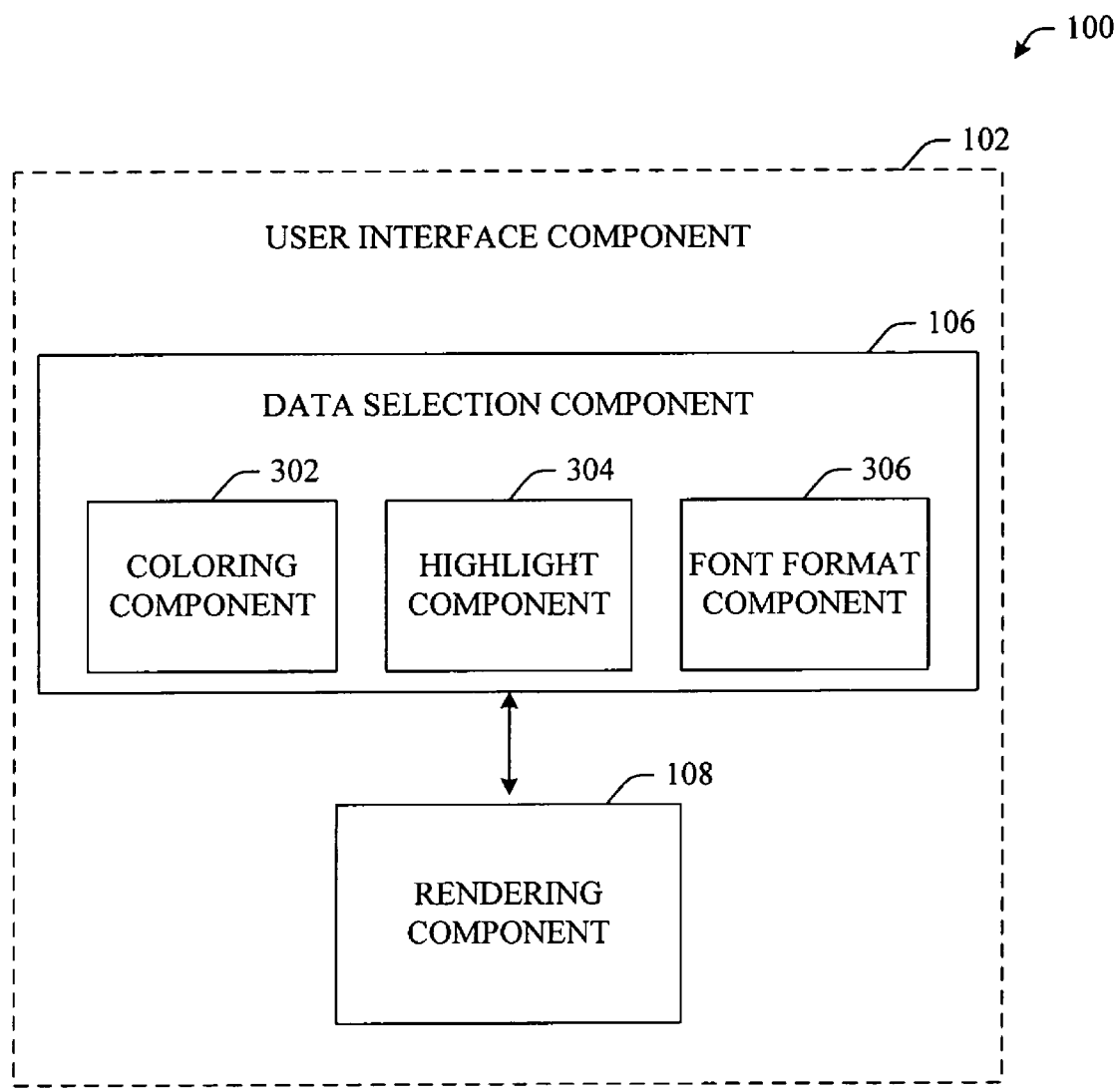
FIG. 3 illustrates a system that employs various mechanisms for annotation in accordance with an aspect of the innovation.

Turning now to FIG. 3, an alternative architectural block diagram of system 100 is shown in accordance with an aspect of the innovation. More particularly, FIG. 3 illustrates three exemplary sub-components of data selection component 106. These three sub-components can facilitate marking of data (and/or regular expression syntax). Although particular marking sub-components are shown in FIG. 3, it is to be understood and appreciated that additional marking options exist and are to be included within the scope of the innovation described herein. To this end, these additional marking sub-components are to be included within the scope of this disclosure and claims appended hereto.

As shown in the exemplary block diagram of FIG. 3, data selection component 106 can include a coloring component 302, a highlighting component 304 and a font format component 306. In operation, each of these sub-components can be employed to conspicuously annotate data and/or segments of a regular expression. By way of example, conspicuous annotation of the regular expression can enable the system render tabulated data that employs the identical conspicuous markings. In other words, the conspicuous annotations can effectively map or link a portion of the regular expression to some subset of the data.

In another example, an annotation sub-component (e.g., 302, 304, 306) can be employed to annotate or re-annotate data such that the system-generated regular expression can be updated/modified accordingly. As described supra, this novel annotation scheme can assist a user in graphically establishing an accurate regular expression of a particular data subset.

Figure 4:
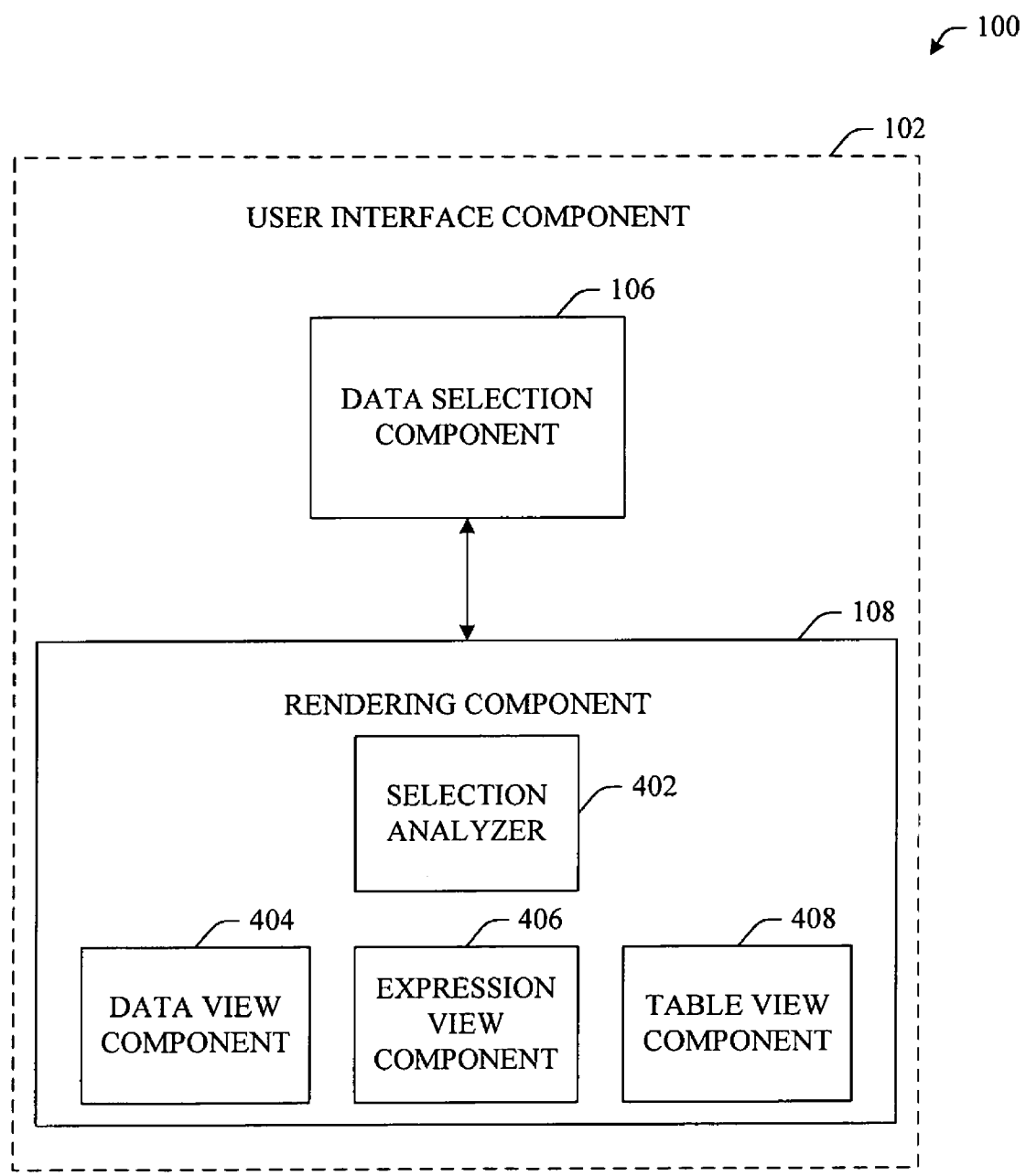
FIG. 4 illustrates a system that employs various mechanisms for rendering data in accordance with an aspect of the novel graphical regular expression innovation.

Referring now to FIG. 4, yet another alternative architectural diagram of system 100 is shown. Specifically, FIG. 4 illustrates that rendering component 108 can include a number of sub-components that effect rendering data in accordance with a regular expression. Generally, in accordance with the aspect illustrated, rendering component 108 can include an analyzer component 402, a data view component 404, an expression view component 406, and a table view component 408. Each of these components will be described in greater detail below. As well, FIG. 5 that follows illustrates an exemplary graphical UI display in accordance with an aspect of the innovation.

As described above, a user can make a selection of data from a data view. For example, a user can use a navigation device, touch screen, stylus, keyboard or the like to make a desired data element selection. Once selected, an analyzer component 402 can be employed to analyze the selection and thereafter automatically generate a system-generated regular expression.

The data view component 404 can be employed to graphically render a view of a specified or determined data store or collection. The expression view 406 can be employed to display the syntactical regular expression generated via the analyzer component 402. Additionally, the table view component 408 can be employed to represent conspicuously annotated data in a tabulated format.

In operation, once a regular expression is annotated, the system can follow the directions of the annotation. For example, the annotation can direct the system to write a particular character, or group of characters, to an output column. As the matching expression is applied multiple times to the input data, the analyzer component 402 (e.g., parser) can convert this input file to a tabular format.

All in all, the subject innovation discloses a system and methodology to visually, via a UI, design, create and implement annotated regular expressions. Additionally, the subject innovation discloses a novel UI that can be employed to simplify the generation, modification and/or verification of these novel regular expression annotations.

Figure 5:
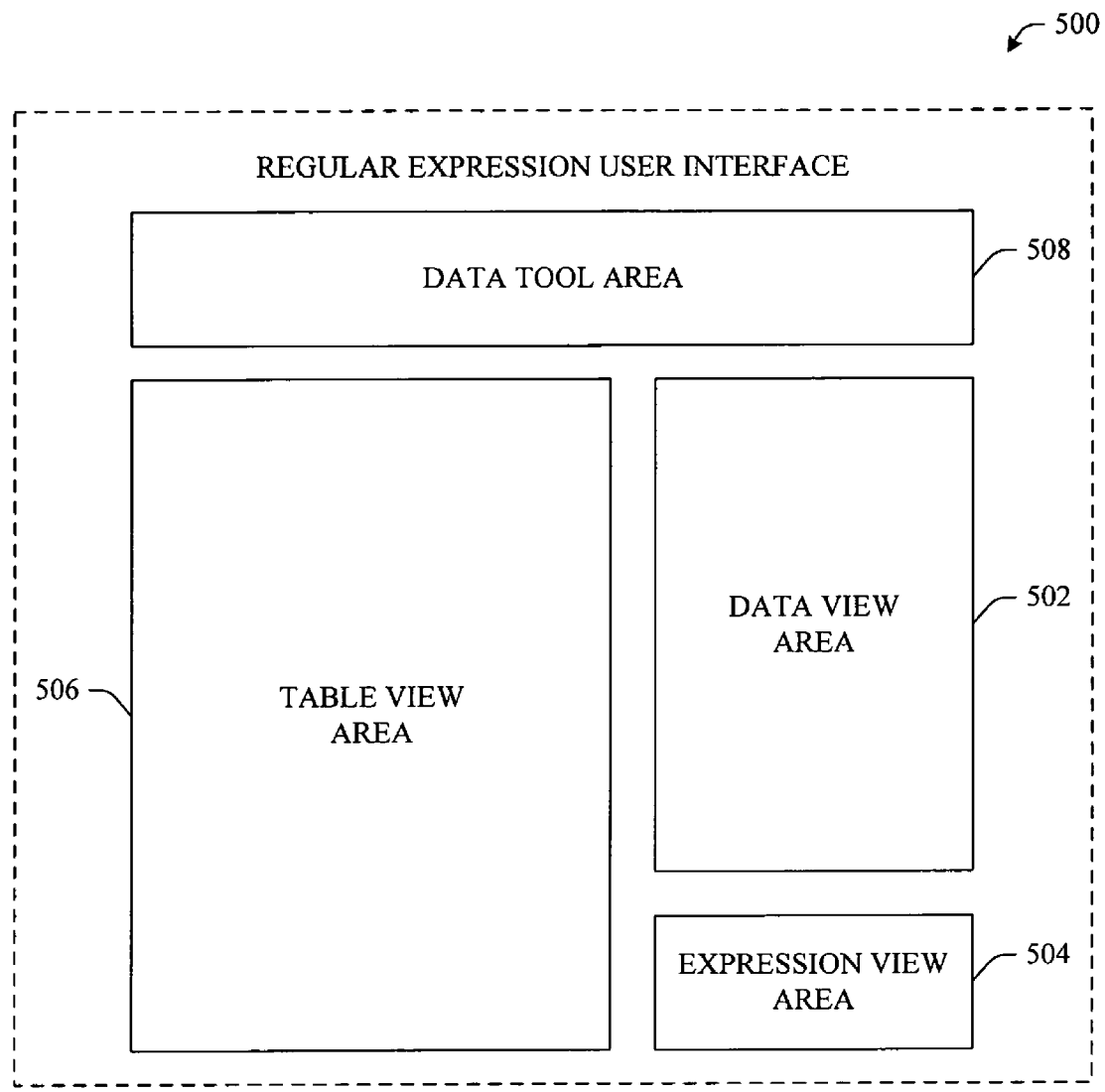
FIG. 5 illustrates an exemplary user interface graphical display orientation in accordance an aspect of the innovation.

FIG. 5 illustrates an exemplary graphical representation 500 of a UI display in accordance with an aspect of the innovation. As shown, the graphical representation 500 can include disparate predefined regions within the display. Although a specific orientation is illustrated in FIG. 5, it is to be understood that this orientation is included to provide perspective to the innovation and is not intended to limit the innovation in any way. It will be appreciated that other orientations exist that include a subset of the information shown as well as other orientations that include information in addition to that shown in FIG. 5. In any case, these alternative aspects are to be included within the scope of this disclosure and claims appended hereto.

As shown in FIG. 5, the graphical UI can include a data view area 502, an expression view area 504 and a data view area 502. Each of these areas has been described in detail supra. In summary, each of these areas can be dynamic with respect to the others. By way of example, as data is selected within the data view area 502, the expression view area 504 can be dynamically updated to reflect a system-generated regular expression that corresponds to the selected data.

Similarly, as the regular expression is updated and/or modified in the expression view area 504, the table view area 506 can likewise be dynamically updated. Moreover, as annotations are applied to the regular expression in the expression view area 504, these annotations can be dynamically rendered within the table view area 506, and vice-versa.

As shown in FIG. 5, the exemplary UI can also include a data selection tool area 508. More particularly, this data tool area 508 can be employed to render a graphical link to data tools including but, not limited to, selection and annotation tools (e.g., coloring, highlighting).

As will be understood, this UI can be very intuitive and can make it easy for a user to generate regular expression and to employ annotations associated therewith. In other words, the novel UI can enable a user to generate and verify a regular expression without knowing the underlying syntax of the regular expression. One way that this novel UI can be employed is by presenting a user with a visual representation as shown in FIG. 5.

Following are a few examples of the novel features of the innovation. These examples are provided in order to add context to the innovation and are not intended to limit the innovation in any way. As described above, within the graphical dialog box 500, the UI can employ several panels (e.g., areas). For example and as described above in greater detail, one panel can be a data panel 502 that represents a data view. In accordance therewith, a user can make a selection of particular text represented within the data view. Once selected, a user can apply an annotation (e.g., marking, color) to the selected text.

In this example, the coloring can serve to distinguish ranges. Upon interpreting data in a text file, the data can be first divided into a number of rows. Continuing with the example, a user could first select all of the text that represents a particular row. Next, the data can be annotated. It will be appreciated, that annotating (e.g., coloring) is one example of marking that can be employed in connection with the novelty of the innovation. It is to be understood and appreciated that other forms of marking, including but, not limited to font characteristics (e.g., bold, italics, underline, size) or other highlighting, can be employed without departing from the spirit and/or scope of the innovation. These alternative marking mechanisms are to be included within the scope of this disclosure and claims appended hereto.

In operation and continuing with the example, a user can employ any hierarchical marking where the widest marking of level one is effected first. Within, this level one marking, the user can then select additional text that can represent individual columns. These individual columns can also be marked (e.g., colored) as desired. In other words, column one can be one color, column two can be another and so on. As these markings are made in the data view, an expression view can display a system-generated syntactical regular expression that potentially matches the range outlined via the visual selections.

By way of more specific example, suppose a user has a text file that represents the text for a book, in this example, the user can make a selection of any desired text from the data view that represents all of the text included within the book. Continuing with the example, the user can select the first word and the space after that word. Thus, the system can automatically generate a regular expression that matches the expression.

In accordance therewith, one expression the system would generate could be an asterisk followed by a space, for example, "*_". It will be understood that this regular expression can yield any number of characters followed by a space when applied to a data set. Further, if this regular expression is applied to the file via a text parser, it would yield rows with one column where the single column would be of a string type and each row would include an instance of a single word.

In another example, a user can select two words and a space. Accordingly, the system would interpret this selection and present a potential regular expression (e.g., "*_*_") in the expression view area. When applied to the file, the parser would generate a result in two word strings, for example, the first row would be the first two words, the second two words would be the second row and so forth.

Here, in the expression, there are two ranges, the first asterisk "*" and the second asterisk "*." As described above, the innovation can facilitate application of annotations within this regular expression. In accordance with the novel functionality of the innovation, these annotations can be applied via a novel UI as described herein. In other words, the innovation can enable graphical creation of a mapping of the sub-expressions to an output column.

Returning to the example of the regular expression "*_*_", the two *'s can be considered the sub-expressions. Therefore within the UI, a third control can be employed that shows the output column control (e.g., table view area). In accordance therewith, a user can click and drag a selection from the data view or from the expression view to an output column view or list. Thus, a linkage can be established thereby annotating the regular expression with respect to a particular output column. In other words, the annotation can define that a particular selection of the regular expression is in fact data for an output column. The particular output column can be defined by where the sub-expression is dragged within the column view.

Additionally, the novel UI can include additional controls that enable adding and/or removing output columns. As well, controls can be provided that enable setting the types of the output columns. Other UI controls can be employed to further enhance the novelty and usefulness of the UI described herein. These additional controls will be understood by those skilled in the art and are to be included within the scope of this disclosure and claims appended hereto.

One novel feature of the innovation is the actual graphical depiction of the data which enables a user to visually interpret the data with respect to a regular expression. Another novel feature of the innovation is the graphical rendering of the regular expression as well as the establishment of the syntactical regular expression within the expression view. Accordingly, a user can prompt an interpretation of how a regular expression will apply to all of the rows in a data view.

It will be appreciated that an error can be generated if the system-established regular expression is not correct. Accordingly, the system will enable a user to manually modify the system-generated regular expression as desired. Once a user changes the expression syntax within the expression view, the coloring within the data view will dynamically change in accordance with the modifications. In other words, once selections are changed in the data view, the expression within the expression view dynamically changes. Similarly, if a change is manually made to the syntax within the expression view, the data view automatically updates to match.

In summary, as described in detail above, the innovation provides a user with a graphical tool that facilitates design of a regular expression. As will be understood, regular expressions are sometimes difficult for even the most experienced computer savvy users. Oftentimes a reference must be on hand to know all of the available characters available within the syntax of regular expressions. As well, oftentimes, repetitive testing is required in order to reach a desired output data set in accordance with the regular expression. Thus, the innovation simplifies this complexity by enabling any user to graphically generate regular expressions while dynamically viewing results in accordance with selections.

In other words, the system can render a graphical view that identifies parts of the data (e.g., text) that match parts of the regular expression. With reference again to the example above, if the regular expression is "*_*_", each "*" can be marked in a unique manner (e.g., color). As such, the text in the output would be colored in accordance with the coloring. In the example, suppose the first * is red, and the second * is blue. In accordance therewith, the output would represent a red word followed by a blue word throughout.

Furthermore, suppose that the system-generated regular expression does not yield the desired output. Rather, suppose the user would prefer to achieve a tabulated output with two words followed by a single word. Accordingly, the regular expression could be modified to be "*_*_*_" where the first two *'s can be marked with red and the third can be marked with blue. In accordance therewith, the output would show two red words mapped to a first column followed by a blue word mapped to another column throughout. It will be understood that this modification can be made either within the syntactical view of the of the expression view or graphically within the data view (e.g., by coloring two words red followed by a blue word).

Figure 6:
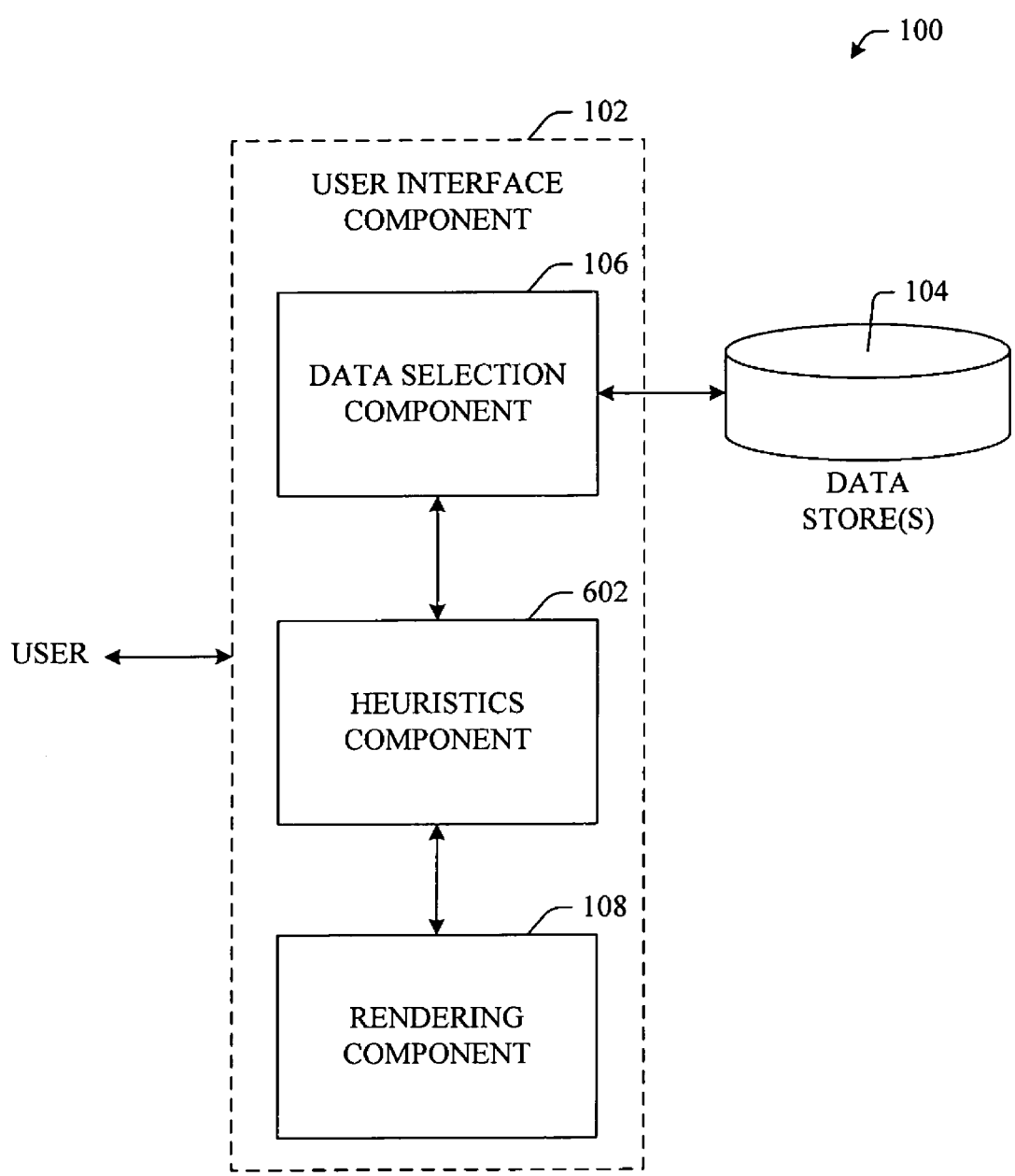
FIG. 6 illustrates an architecture including a heuristics component that can automate functionality in accordance with an aspect of the novel innovation.

Referring now to FIG. 6, yet another alternative system 600 that facilitates graphical authoring of a regular expression in accordance with an aspect of the innovation. As shown, system 600 can include a heuristics component 602 that can automate one or more features of the innovation. More particularly, the heuristics component 602 can automate one or more features of the system 600 based at least in part upon historical, probabilistic, and/or statistical analysis. In operation, the heuristics component 602 can facilitate logic and/or reasoning (e.g., artificial intelligence (AI)) in order to automate one or more novel features of the innovation.

In one aspect, the subject innovation (e.g., in connection with data selection, annotation) can employ various AI-based schemes for carrying out various aspects thereof. For example, a process for determining when to select a data element, when, if or how to annotate with respect to an output table, etc. can be facilitated via an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of database systems, for example, attributes can be words or phrases or other data-specific attributes derived from the words (e.g., database tables, the presence of key terms), and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a selection is to effectuated, when an annotation should be applied, which specific markings should be employed with respect to an annotation, how to apply the annotation with respect to output columns, etc.

Figure 7:
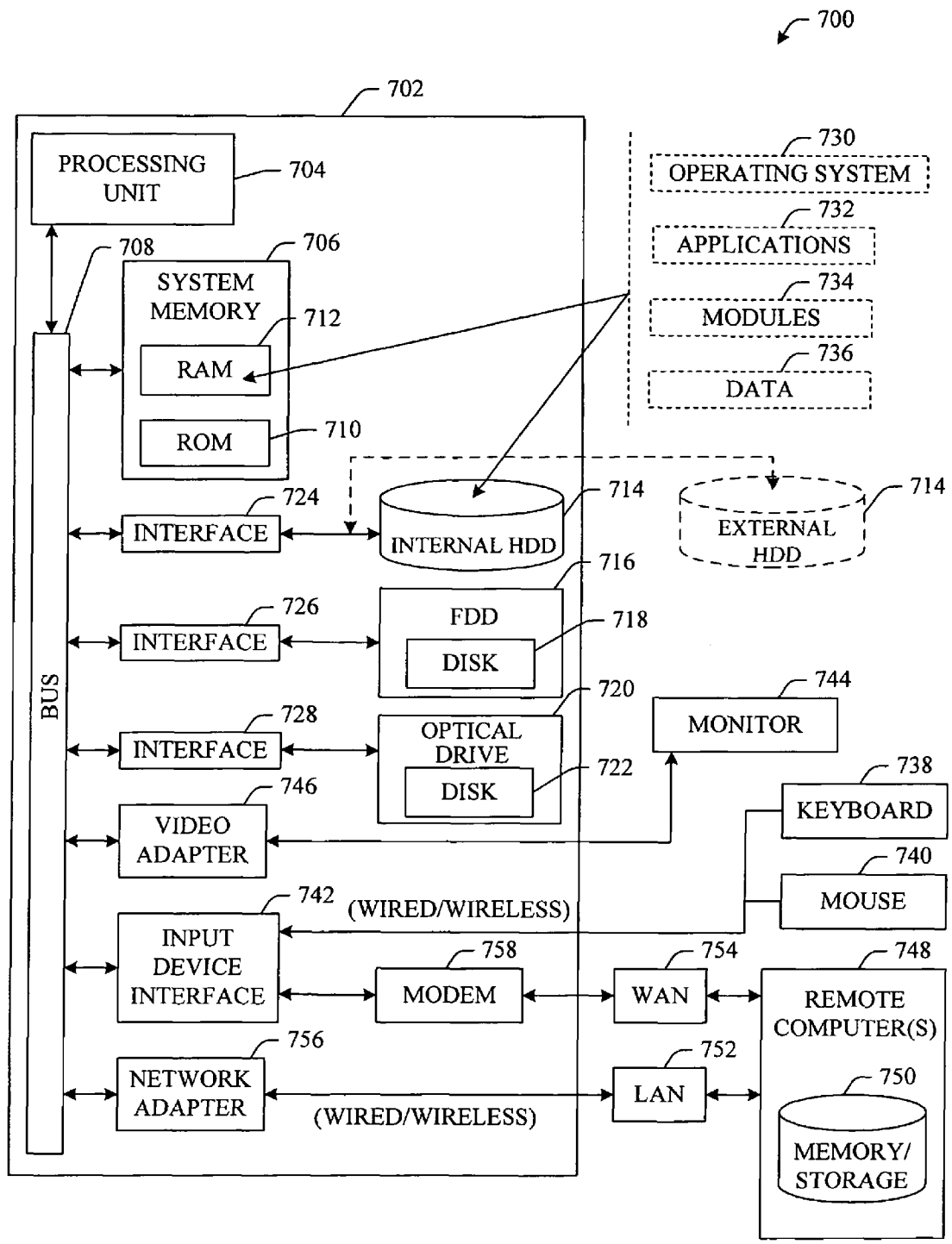
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the subject innovation, FIG. 7 and the following discussion are intended to provide a brief, general description of a suitable computing environment 700 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects of the innovation includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the innovation can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 8:
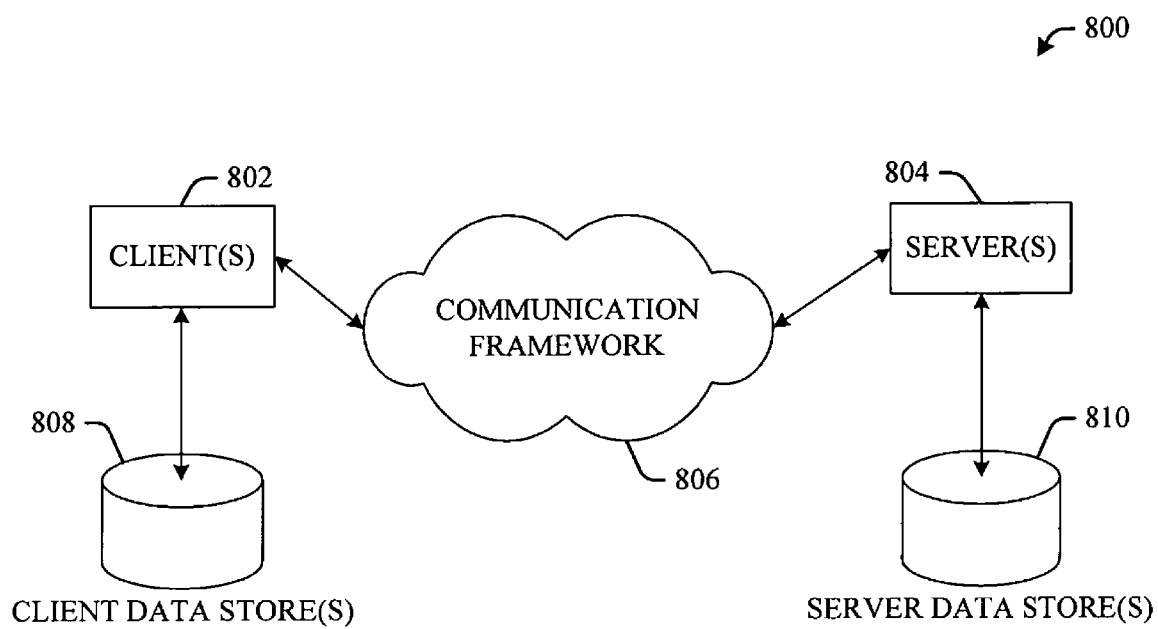
FIG. 8 illustrates a schematic block diagram of an exemplary computing environment in accordance with the subject innovation.

Referring now to FIG. 8, there is illustrated a schematic block diagram of an exemplary computing environment 800 in accordance with the subject innovation. The system 800 includes one or more client(s) 802. The client(s) 802 can be hardware and/or software (e.g., threads, processes, computing devices). The client(s) 802 can house cookie(s) and/or associated contextual information by employing the innovation, for example.

The system 800 also includes one or more server(s) 804. The server(s) 804 can also be hardware and/or software (e.g., threads, processes, computing devices). The servers 804 can house threads to perform transformations by employing the innovation, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates graphical design of a regular expression, comprising a memory having stored therein the following computer executable components:
    a data store component that stores information;
    a data view component that enables a user to display one or more parts of the stored information, wherein the stored information is stored in a plurality of different data formats;
    a metadata component that defines how data files of each different data format type are to be parsed, such that a generic parser is usable for parsing the plurality of different stored data types;
    a data selection component that enables the user to graphically and arbitrarily select any portion of text from the displayed information, regardless of the data format;
    a rendering component that automatically generates a regular expression comprising one or more specialized characters or character sets that have a predefined meaning for parsing text, the regular expression being derived from and based on the graphically and arbitrarily selected portion of text, wherein the rendered regular expression comprises a custom metadata annotation applied by the generic parser indicating the data type of the selected portion of text, and wherein the automatically generated regular expression is displayed in syntactical form including the one or more specialized characters and/or character sets; and
    a processor that executes the computer executable components, wherein the rendering component comprises a heuristics component that employs at least one of a probabilistic-based or statistical-based analysis to automatically generate the regular expression.

2. The system of claim 1, wherein the data selection component enables the user to mark one or more portions of the regular expression, wherein the rendering component dynamically displays an output associated with the user's application of the marked regular expression on one or more parts of the stored information, and wherein the rendering component marks the output in association with the marked one or more portions of the regular expression to assist the user in at least one of validating or understanding the automatically generated regular expression.

3. The system of claim 2, wherein the data selection component includes at least one of a coloring component that enables the user to color the one or more portions of the regular expression, a highlighting component that enables the user to highlight the one or more portions of the regular expression, or a font formatting component that enables the user to adjust the font of the one or more portions of the regular expression; and wherein the output is at least one of colored, highlighted, or font adjusted based on coloring, highlighting, or font adjustment of the regular expression.

4. The system of claim 1, further comprising a dialog box that includes a data view area from which the user selects the text, an expression view area that displays the automatically generated regular expression, and a data tool area that renders a graphical link to at least one of data selection tools or annotation tools.

5. The system of claim 4, further comprising a table view area that displays one or more output columns, wherein the data selection component facilitates application of an annotation of the regular expression to links a portion of the regular expression to the one or more output columns.

6. A computer-implemented method of designing a regular expression, comprising:
storing data in a computer-readable medium;
displaying at least a portion of the stored data in a data view via a processor, wherein the stored information is stored in a plurality of different data formats;
applying metadata that defines how data files of each different data format type are to be parsed, such that a generic parser is usable for parsing the plurality of different stored data types;
enabling a user to graphically and arbitrarily select any one or more sections of the displayed data, regardless of the data format;
automatically generating a regular expression comprising one or more specialized characters or character sets that have a predefined meaning for parsing text, the regular expression being derived from and based on the graphically and arbitrarily selected section of data;
enabling the user to apply the regular expression to a body of text; and
displaying text that matches the regular expression in at least one of a tabulated viewing area or a column viewing area, wherein the rendered regular expression comprises a custom metadata annotation applied by the generic parser indicating the data type of the selected portion of text, and wherein the automatically generated regular expression is displayed in syntactical form including the one or more specialized characters and/or character sets, and wherein rendering the rendered regular expression comprises implementing a heuristics component that employs at least one of a probabilistic-based or statistical-based analysis to automatically generate the regular expression.

7. The computer-implemented method of claim 6, further comprising enabling the user to apply an annotation to one or more portions of the regular expression, wherein the annotation comprises at least one of coloring, highlighting, or font formatting of the one or more portions of the regular expression, and wherein the annotation is applied to text displayed in at least the tabulated or column viewing area that matches the one or more portions of the regular expression.

8. The computer-implemented method of claim 7, further comprising:
enabling the user to map the annotation to one or more columns of the column viewing area, wherein text that matches the annotation is displayed in the one or more columns.

9. The computer-implemented method of claim 6, further comprising enabling the user to manually modify the regular expression, wherein at least the tabulated viewing area or the column viewing area is dynamically updated based on the manual modification of the regular expression.

10. A computer-executable system of identifying a data pattern, comprising a memory having stored therein computer executable components providing:
means for storing information;
means for displaying one or more parts of the stored information, wherein the stored information is stored in a plurality of different data formats;
means for implementing metadata to define how data files of each different data format type are to be parsed, such that a generic parser is usable for parsing the plurality of different stored data types;
means for enabling a user to graphically and arbitrarily select any subset of data elements displayed in a data view, regardless of which of a plurality of different data formats the data elements are stored in;
means for automatically generating a regular expression comprising one or more specialized characters or character sets that have a predefined meaning for parsing text, the regular expression being derived from and based on the graphically and arbitrarily selected subset of data elements, wherein the rendered regular expression comprises a custom metadata annotation applied by the generic parser indicating the data type of the selected portion of text, and wherein the automatically generated regular expression is displayed in syntactical form including the one or more specialized characters and/or character sets, and wherein rendering the rendered regular expression comprises implementing a heuristics component that employs at least one of a probabilistic-based or statistical-based analysis to automatically generate the regular expression; and
a processor that executes the computer executable components.

11. The computer-executable system of claim 10, further comprising:
means for enabling the user to apply the syntactical regular expression to data displayed in the data view; and
means for displaying data that matches the syntactical regular expression in an output viewing area, based on applying the syntactical regular expression to the data displayed in the data view.

12. The computer-executable system of claim 11,
means for enabling the user to modify the syntactical regular expression in text form; and
means for dynamically updating the output viewing area based on the user's modification of the syntactical regular expression.

13. The computer-executable system of claim 10, further comprising means for mapping a portion of the syntactical regular expression to a column in a table view.

14. The computer-executable system of claim 13, wherein the means for mapping the portion of the syntactical regular expression to the column in the table view comprises annotating the syntactical regular expression with information directing the system to store data that matches one or more parts of the syntactical regular expression to the column of the table.

* * * * *